United States Patent
Eltrop

(10) Patent No.: US 10,239,384 B2
(45) Date of Patent: Mar. 26, 2019

(54) AIR OUTLET DEVICE FOR FEEDING AIR TO A VEHICLE INTERIOR IN AN CONTROLLED MANNER

(71) Applicant: Bayerische Motoren Werke Aktiengesellschaft, Munich (DE)

(72) Inventor: Raphael Eltrop, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/436,090

(22) Filed: Feb. 17, 2017

(65) Prior Publication Data

US 2017/0158029 A1    Jun. 8, 2017

Related U.S. Application Data

(63) Continuation of application No. PCT/EP2015/068109, filed on Aug. 5, 2015.

(30) Foreign Application Priority Data

Aug. 21, 2014   (DE) ......................... 10 2014 216 573

(51) Int. Cl.
*B60H 1/34* (2006.01)
*B60H 1/00* (2006.01)

(52) U.S. Cl.
CPC ....... *B60H 1/3428* (2013.01); *B60H 1/00564* (2013.01)

(58) Field of Classification Search
CPC .... F24F 13/075; B60H 1/3428; B60H 1/3435
(Continued)

(56) References Cited

U.S. PATENT DOCUMENTS 4,377,107 A     3/1983   Izumi
4,665,804 A *   5/1987   Miyasaka ............ B60H 1/3428
                                                            454/315
(Continued)

FOREIGN PATENT DOCUMENTS

DE         199 43 822 A1    3/2001
DE    10 2006 002 663 A1    8/2007
(Continued)

OTHER PUBLICATIONS

International Search Report (PCT/ISA/210) issued in PCT Application No. PCT/EP2015/068109 dated Oct. 9, 2015 with English translation (Six (6) pages).

(Continued)

*Primary Examiner* — Vivek Shirsat
(74) *Attorney, Agent, or Firm* — Crowell & Moring LLP

(57) ABSTRACT

An air outlet device for feeding air to a vehicle interior of a motor vehicle in a controlled manner includes an air flow duct and an air outlet opening element with an air outlet opening. The air flow duct is connected to the air outlet opening element and is adapted to conduct air from an interior ventilation device into the vehicle interior via the air outlet opening. The air flow duct has a first duct segment and a second duct segment, which is arranged between the first duct segment and the air outlet opening element. The first duct segment can be displaced in direction transverse to the longitudinal axis of the first duct segment. The first duct segment is designed to control a direction of the air flowing out of the air outlet opening in accordance with the displacement of the first duct segment. At least one fin-like, movable air-conducting element is arranged in the first duct segment, can be displaced together with the first duct segment, and is adapted to control a direction of the air flowing in the first duct segment and thus a direction of the (Continued)

air flowing out of the air outlet opening in accordance with the position of the air-conducting element.

19 Claims, 3 Drawing Sheets

(58) Field of Classification Search
USPC .......................................... 454/155, 316, 313
See application file for complete search history.

(56) References Cited

U.S. PATENT DOCUMENTS

| | | | | |
|---|---|---|---|---|
| 5,056,420 | A | * 10/1991 | Komori | ................ B60H 1/3421 454/155 |
| 2006/0223430 | A1 | * 10/2006 | Shibata | ................ B60H 1/3421 454/155 |

FOREIGN PATENT DOCUMENTS

| | | |
|---|---|---|
| DE | 10 2006 032 587 A1 | 1/2008 |
| DE | 10 2013 209 430 B3 | 9/2014 |
| JP | 60-169044 A | 9/1985 |

OTHER PUBLICATIONS

German-language Written Opinion (PCT/ISA/237) issued in PCT Application No. PCT/EP2015/068109 dated Oct. 9, 2015 (Six (6) pages).

German-language Search Report issued in counterpart German Application No. 10 2014 216 573.3 dated Feb. 9, 2015 with partial English translation (Thirteen (13) pages).

English Translation of Chinese Office Action issued in counterpart Chinese Application No. 201580044075.2 dated Jun. 6, 2018 (two (2) pages).

* cited by examiner

AIR OUTLET DEVICE FOR FEEDING AIR TO A VEHICLE INTERIOR IN AN CONTROLLED MANNER

CROSS REFERENCE TO RELATED APPLICATIONS

This application is a continuation of PCT International Application No. PCT/EP2015/068109, filed Aug. 5, 2015, which claims priority under 35 U.S.C. § 119 from German Patent Application No. 10 2014 216 573.3, filed Aug. 21, 2014, the entire disclosures of which are herein expressly incorporated by reference.

BACKGROUND AND SUMMARY OF THE INVENTION

The present invention relates to an air outlet device for feeding air to a vehicle interior of a motor vehicle in a controlled manner, i.e. an air discharge device for ventilating the vehicle interior of the motor vehicle with air which may be air conditioned.

A known air outlet device in a motor vehicle is arranged, for example, in the region of a dashboard of a motor vehicle interior. The known air outlet device has means which make it possible to adjust a direction of the air flowing out of an air outlet opening of the air outlet device. A known air outlet opening has, for example, a rectangular cross section, wherein a plurality of fins are arranged parallel to one another and at the same time in a pivotable manner adjacent to or in the air outlet opening. Pivoting of said fins permit, for example, the exiting air to be controlled in a direction downward or in a direction upward. Further fins are arranged parallel to one another and at the same time in a pivotable manner in an air flow duct of the air outlet device behind the air outlet opening, said fins being able to change a direction of the exiting air to the left or to the right.

The air flow can be better controlled here the longer the fins in the air flow direction are or the closer the fins are arranged with respect to one another. A close arrangement of the fins has the property that, although a direction of the discharging air can be sufficiently controlled, an exiting quantity of air becomes smaller as the fins pivot increasingly out of a central position.

It is the object of the present invention to provide an air outlet device for feeding air to a vehicle interior in a controlled manner, said air outlet device permitting a large quantity of air in all discharge directions of the air.

This object is achieved by an air outlet device for feeding air to a vehicle interior in a controlled manner in accordance with embodiments of the invention.

In particular, an air outlet device according to the invention for feeding air to a vehicle interior, i.e. a passenger compartment, of a motor vehicle in a controlled manner has an air flow duct and an air outlet opening element which has an air outlet opening. Air which flows out of the air flow duct can in particular flow through the air outlet opening into the vehicle interior in a directed manner. The air flow duct is connected to the air outlet opening element and is adapted to conduct air from an interior ventilation device via the air outlet opening into the vehicle interior. The air outlet opening element can be mounted in particular in a positionally fixed manner in the vehicle interior. The air flow duct has a first duct portion and a second duct portion, which is arranged between the first duct portion and the air outlet opening element. In other words, the first duct portion, the second duct portion and the air outlet opening element are arranged one behind another in the air flow direction. The first duct portion is designed so as to be displaceable, i.e. shiftable in a translatory manner, in a direction transversely with respect to its longitudinal axis. In particular, the first duct portion is designed in order to control a direction of the air flowing out of the air outlet opening in accordance with the displacement of said duct portion, i.e. to adjust a direction of the discharging air.

The second duct portion is preferably arranged adjacent to the first duct portion, wherein the air outlet opening element is arranged adjacent to the second duct portion.

The air outlet opening element can be arranged or can be mounted, for example, on a dashboard, a vehicle door or a central console. The interior ventilation device can be, for example, an air conditioning device which produces fresh air and/or air-conditioned air and conveys same to the vehicle interior.

By means of a displacement of the first duct portion, which is arranged spaced apart from the air outlet opening, a direction of the air flowing from the first duct portion and to the air outlet opening can be changed in a simple manner. By this means, the direction of the air flowing out of the air outlet opening is also correspondingly changed. Depending on the distance between the first duct portion and the air outlet opening, i.e. depending on the length of the second duct portion, the direction of the air is changed in accordance with a displacement of the first duct portion.

According to a preferred development, the second duct portion connects the first duct portion to the air outlet opening element. The second duct portion here has wall portions which are pivotable in accordance with the displacement of the first duct portion in order to control a direction of the air flowing out of the air outlet opening in accordance with a position of the wall portions.

The wall portions take on the function here of controllable air conducting elements, i.e. fins.

According to a further preferred development, the first duct portion has a first wall and a second wall which are formed opposite each other. Opposite each other means in particular parallel to each other. The first wall and the second wall, as part of the first duct portion, are displaceable with the duct portion. The first wall and the second wall are in particular rigid, fixed portions of the first duct portion which are not movable relative to each other. Furthermore, the first wall and the second wall are preferably formed transversely, i.e. substantially perpendicularly, with respect to a direction of displacement of the first duct portion.

Furthermore, the first duct portion can be delimited by a third wall and a fourth wall which are arranged opposite each other, i.e. substantially parallel to each other, and in particular extend parallel to a direction of displacement of the first duct portion. The third wall and fourth wall can be formed integrally with the first duct portion, i.e. so as to be movable together with the first duct portion. Alternatively, the third wall and fourth wall can be formed in a fixed manner independently of the first duct portion, wherein the first duct portion is displaceable together with the first wall and the second wall between the third and fourth wall in the direction of displacement.

According to a preferred development, at least one fin-like movable air conducting element is arranged in the first duct portion, said air conducting element being displaceable together with the first duct portion and being adapted to control a direction of the air flowing into the first duct portion and a direction of the air flowing air outlet opening in accordance with a position of the air conducting element.

By this means, the discharging air can not only be changed in its direction in the direction of the direction of displacement of the first duct portion, but also in a further direction which is controlled by the air conducting element in the first duct portion.

Further fin-like, movable air elements can also be arranged in the first duct portion, wherein the air elements are preferably designed so as to be movable or activatable in parallel and jointly, i.e. substantially synchronously.

According to a development, the air conducting element is rotatable about an axis. The axis preferably runs substantially parallel to the direction of displacement of the first duct portion.

The air can therefore be controlled in a direction transversely or perpendicularly with respect to the direction of displacement of the first duct portion. Together with a displacement of the first duct portion, air flowing out of the air outlet opening can therefore be controlled in all directions.

According to a preferred development, the first duct portion can have at least one intermediate wall which divides the first duct portion into at least two air passages. The intermediate wall, like the first wall and the second wall, is therefore formed integrally with the first duct portion and is designed so as to be displaceable together with the first duct portion.

The division of the first duct portion into two air passages makes it possible to better align the flowing air. The intermediate wall serves here in addition to the first wall and the second wall as an air conducting element.

When the first duct portion has an intermediate wall, at least one fin-like, movable air conducting element or a plurality of air conducting elements can be arranged in each of the two air passages, and therefore a flow direction of the air can be correspondingly adapted in each of the two air passages.

According to a further preferred development, the second duct portion has at least one intermediate wall which divides the second duct portion into at least two air passages.

The intermediate wall of the second duct portion is preferably pivotable in accordance with a displacement of the first duct portion. Furthermore, the intermediate wall of the second duct portion is preferably designed as a manual actuating element for controlling the displacement of the first duct portion. For this purpose, the intermediate wall can be operatively connected to the first duct element. For the manual actuation, the intermediate wall can have an optionally protruding gripping portion which a vehicle occupant can grip and via which the vehicle occupant can pivot the intermediate wall—to control the first duct portion—and can displace them—to control the air conducting element in the first duct portion.

The first duct portion and the second duct portion can have an intermediate wall; however, it is also possible for only one of the two duct portions to have an intermediate wall. The first duct portion and the second duct portion can also have a plurality of intermediate walls.

The first duct portion preferably has a substantially rectangular flow cross section, i.e. an effective inner cross section. Similarly, the second duct portion and/or the air outlet opening can have a substantially rectangular flow cross section.

The present invention furthermore relates to a motor vehicle with an air outlet device according to the invention for feeding air to a vehicle interior in a controlled manner. The air outlet opening here preferably has a rectangular cross section, wherein the air outlet opening is arranged transversely and not upright in the vehicle interior.

The above developments of the invention may be combined with one another as desired to the extent possible and expedient.

Other objects, advantages and novel features of the present invention will become apparent from the following detailed description of one or more preferred embodiments when considered in conjunction with the accompanying drawings.

DETAILED DESCRIPTION OF THE DRAWINGS

An exemplary embodiment of the present invention is described below with reference to FIGS. 1 to 6.

Figure 1:
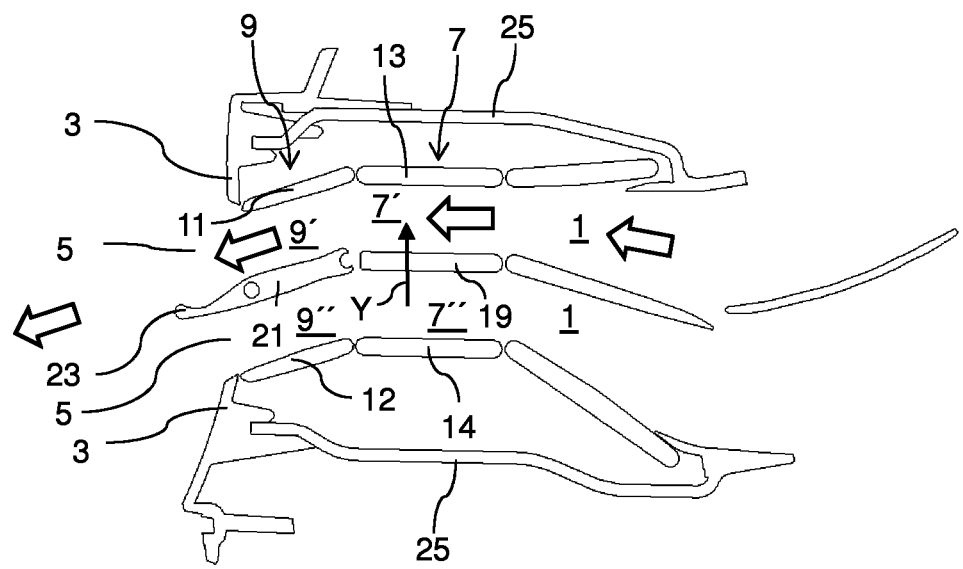
FIG. 1 is a schematic sectioned side view of an air outlet device according to an exemplary embodiment of the present invention in a first position of a first duct portion.

As is shown in FIG. 1, the air outlet device according to the exemplary embodiment of the present invention has an air flow duct 1 and an air outlet opening element 3. The air outlet opening element 3 has an air outlet opening 5 through which air can be conducted from an interior ventilation and air conditioning device into a motor vehicle interior. The air outlet opening element 3 is integrated visibly, for example, in a dashboard of the motor vehicle. The air outlet opening 5 has a rectangular cross section, wherein the air outlet opening 5 is arranged, preferably in the transverse direction, in the dashboard of the motor vehicle. The air flow duct 1 is connected to the air outlet opening element 3, wherein said air flow duct can conduct air from the interior ventilation and air conditioning device via the air outlet opening 5 into the motor vehicle interior. The air outlet device is furthermore configured in such a manner that air is conducted in a controlled manner in a transverse direction of the vehicle and a vertical direction of the vehicle from the air outlet opening 5 into the vehicle interior. A vehicle driver or a passenger can in particular adjust a direction of the exiting air by means of manual actuation.

The air flow duct 1 has, inter alia, a first duct portion 7 and a second duct portion 9, wherein the second duct portion is arranged between the first duct portion 7 and the air outlet opening element 5.

The first duct portion 7 is designed so as to be displaceable in a direction transversely with respect to its longitudinal axis and is displaceable in particular in the vertical direction of the vehicle.

The second duct portion 9 has pivotable wall portions 11 and 12 which connect the first duct portion 7 to the air outlet opening element 3 or the air outlet opening 5. The wall portions 11 and 12 are in particular pivotable in accordance with a displacement of the first duct portion 7. By this means, the wall portions 11 and 12 form air conducting surfaces which conduct or align the air flowing through the air flow duct 1 in accordance with the position of the first duct portion 7. In the position of the first duct portion 7 that is illustrated in FIG. 1, the first duct portion 7 is in a first, upper position, as a result of which the wall portions 11 and 12 are correspondingly pivoted and conduct air obliquely downward in the direction of the air outlet opening 5. By this means, i.e. in this position of the first duct element 7, the air flowing out of the air outlet opening 5 into the vehicle interior is directed or conducted downward.

The first duct portion 7 is provided with a first upper wall 13 and a second lower wall 14 which are formed parallel to each other and are formed in particular parallel to an x direction in a vehicle coordinate system. The first wall 13 and the second wall 14 are likewise displaced in accordance with a displacement of the first duct portion 7, wherein the first wall 13 and the second wall 14 also constitute air conducting elements which are fixed with respect to the first duct portion 7.

Furthermore, the first duct portion 7 has an intermediate wall 19 which is fixed with respect to the first duct portion 7 and divides the first duct portion 7 into an upper air passage 7' and a lower air passage 7". In accordance with the division of the first duct portion 7 into the two air passages 7' and 7", the second duct portion 9 is also divided into two air passages 9' and 9" by means of a pivotable intermediate wall 21. The intermediate wall 21 is pivotable along a pivot axis in the transverse direction of the flow duct 1 and has in particular an actuating portion 23 which protrudes from the air outlet opening 5 and with which a vehicle occupant can pivot the wall portion 21 about its pivot axis. A rear end of the wall portion 21 is operatively connected to the first duct portion 7, and therefore pivoting of the intermediate wall 21 brings about a corresponding displacement of the first duct portion 7.

The first duct portion 7 and the second duct portion 9 are furthermore accommodated in a fixed housing 25 of the air outlet device, within which housing the first duct portion 7 can be displaced and the second duct portion 9 can be pivoted.

Figure 2:
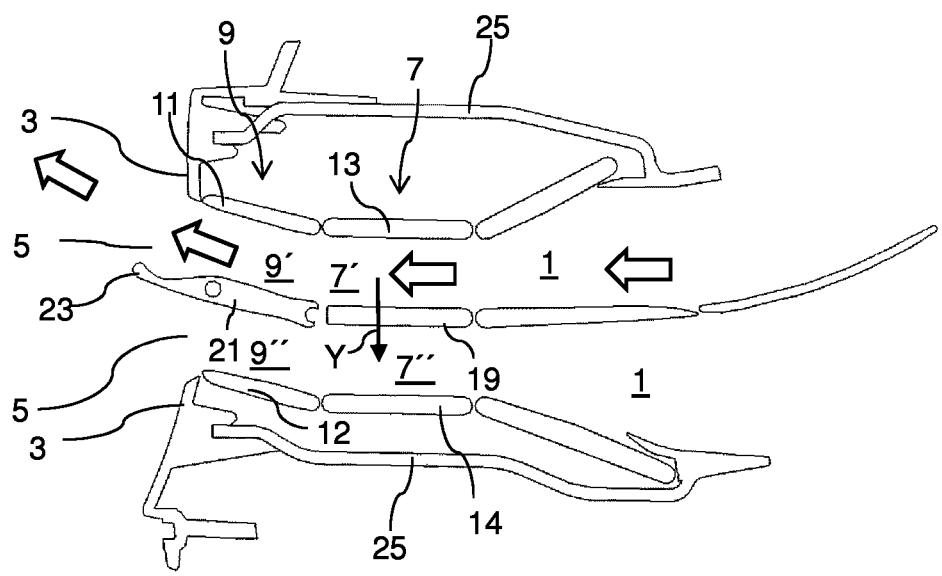
FIG. 2 is a schematic sectioned side view of the air outlet opening according to the exemplary embodiment of the present invention in a second position of the first duct portion.
Figure 3:
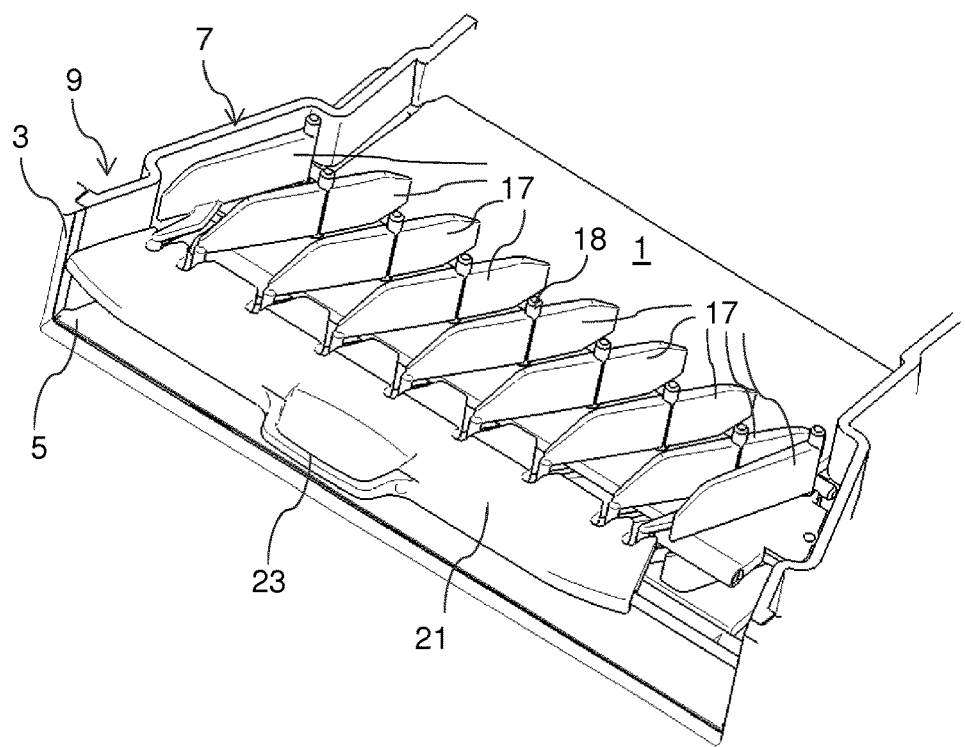
FIG. 3 is a sectioned perspective view of the air outlet opening according to the exemplary embodiment of the invention, wherein air conducting elements are located in a first position in the first duct portion.
Figure 4:
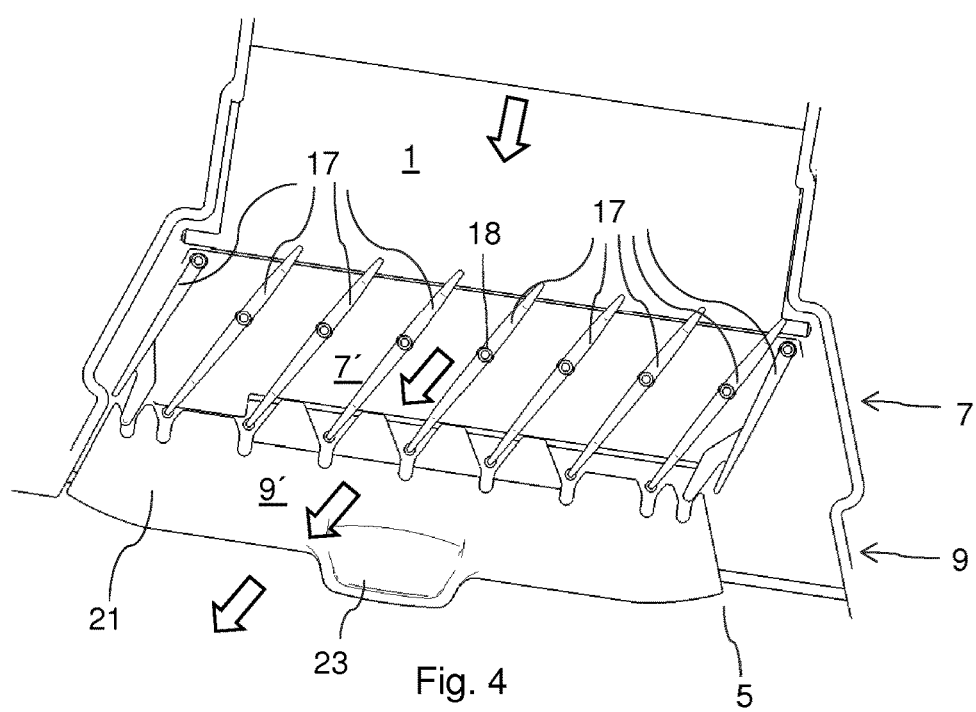
FIG. 4 is a schematic sectioned top view of the air outlet device according to the exemplary embodiment of the invention, wherein the air conducting elements are located in the first position in the first duct portion.
Figure 5:
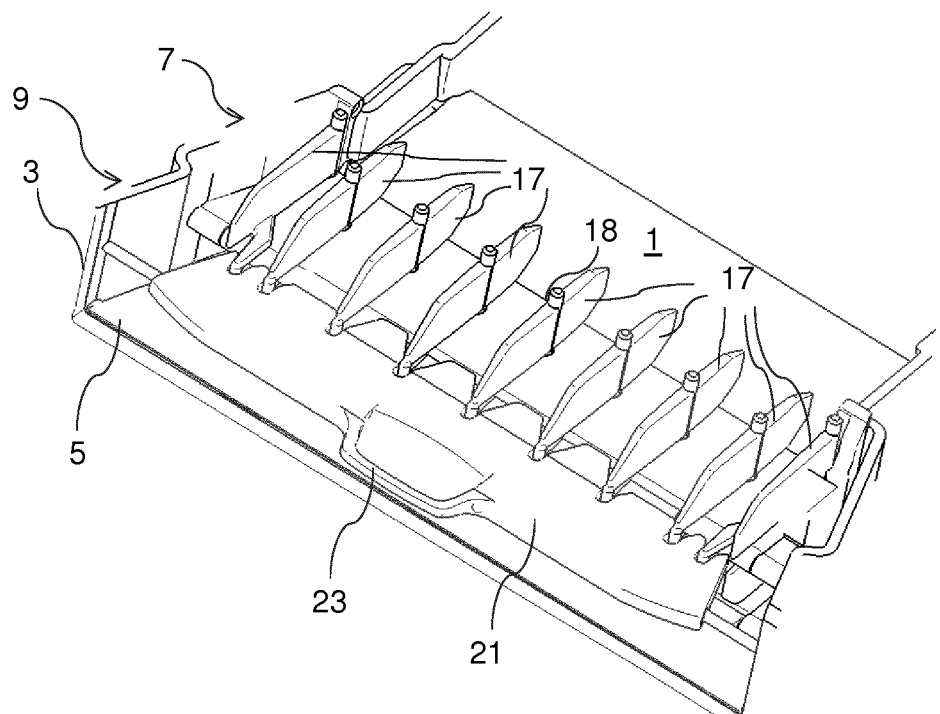
FIG. 5 is a schematic sectioned perspective view of the air outlet device according to the exemplary embodiment of the invention, wherein the air conducting elements are located in a second position in the first duct portion.
Figure 6:
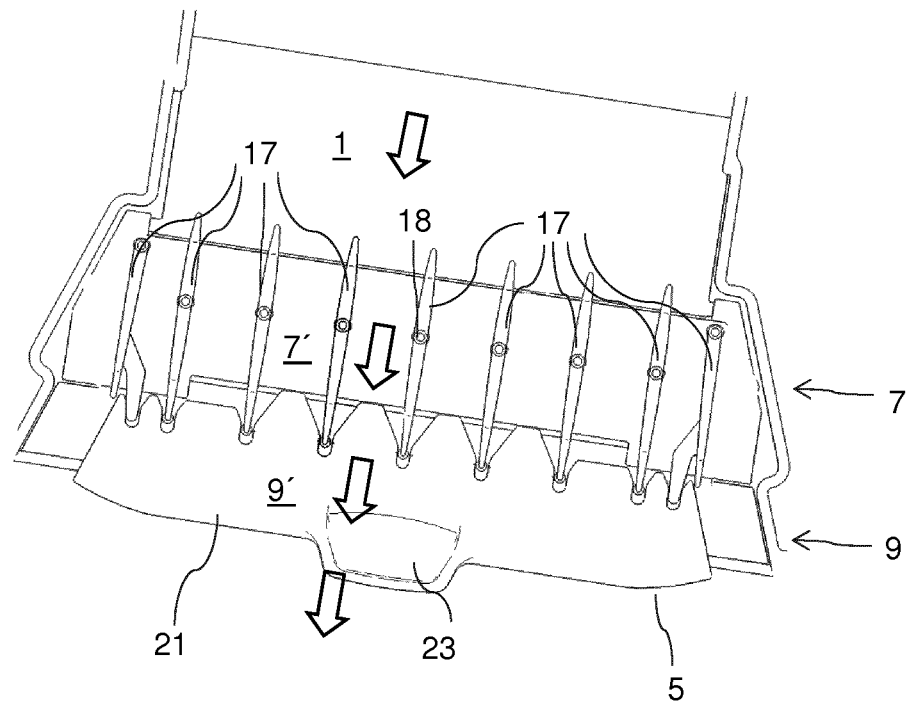
FIG. 6 is a schematic sectioned top view of the air outlet device according to the exemplary embodiment of the present invention, wherein the air conducting elements are located in the second position in the first duct portion.

FIG. 2 shows a position of the first duct portion 7, wherein the first duct portion 7 has been displaced completely downward. Furthermore, in this position of the first duct portion 7, the wall portions 11 and 12 of the second duct portion 9 are correspondingly pivoted, and therefore said wall portions conduct flowing air in a direction upward. As is shown in FIG. 2, the intermediate wall 21 is also correspondingly pivoted.

As is shown in FIGS. 3 to 6, air conducting elements 17 are arranged parallel to one another in the air passage 7'. The air conducting elements 17 are not illustrated in FIGS. 1 and 2. Air conducting elements are also arranged in the air passage 7", but are not shown in the figures and are not described in more detail below so as to avoid a redundant description. The air conducting elements 17 are each pivotable synchronously with one another via an axis 18 which extends in the vertical direction of the vehicle and in the direction of displacement of the first duct portion 7. By means of one position of the air conducting elements 17, a direction of the discharging air can be changed in the transverse direction of the vehicle, i.e. in the Y direction in the vehicle coordinate system. Discharging air can therefore be changed in a vertical direction of the vehicle by means of displacement of the first duct portion 7 and in a transverse direction of the vehicle by means of the air conducting elements 17 being pivoted or rotated in the transverse direction of the vehicle.

The intermediate wall 21 in the second duct portion 9 is operatively connected to the front ends of the air conducting elements 17, wherein displacement of the intermediate wall 21 in the transverse direction of the vehicle, i.e. Y direction, by way of the handle 23 causes the air conducting elements 17 to correspondingly pivot.

Overall, a flow direction of the discharging air can therefore be adjusted manually in the transverse direction of the vehicle or vertical direction of the vehicle by actuation of the actuating element 23 a flow direction of the air flowing out of the air outlet opening 5. As a result, by means of the combined effect of the displaceability of the first duct portion 7 and of the air conducting elements 17, the discharging air can be controlled in all directions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air outlet device for feeding air to a vehicle interior in a controlled manner, the air outlet device comprising:
   an air flow duct;
   an air outlet opening element which has an air outlet opening, wherein
   the air flow duct is connected to the air outlet opening element and is adapted to conduct air from an interior ventilation device via the air outlet opening into the vehicle interior,
   the air outlet opening element is formed in a positionally fixed manner, and the air flow duct has a first duct portion and a second duct portion, the second duct portion being arranged between the first duct portion and the air outlet opening element,
   the first duct portion is designed so as to be displaceable in a direction transversely with respect to its longitudinal axis, and
   at least one fin-shaped, movable air conducting element is arranged in the first duct portion, said air conducting element being displaceable together with the first duct portion and being adapted to control a direction of the air flowing in the first duct portion and therefore a direction of the air flowing out of the air outlet opening in accordance with a position of the air conducting element, wherein
   the at least one fin-shaped, movable air conducting element pivots about an axis that passes through the first duct portion.

2. The air outlet device according to claim 1, wherein the second duct portion connects the first duct portion to the air outlet opening element and has wall portions, which are pivotable in accordance with the displacement of the first duct portion, in order to control a direction of the air flowing out of the air outlet opening in accordance with a position of the wall portions.

3. The air outlet device according to claim 1, wherein the first duct portion has a first wall and a second wall which are formed opposite each other and transversely with respect to a direction of displacement of the first duct portion.

4. The air outlet device according to claim 2, wherein the first duct portion has a first wall and a second wall which are formed opposite each other and transversely with respect to a direction of displacement of the first duct portion.

5. The air outlet device according to claim 1, wherein the air conducting element is rotatable about an axis which runs parallel to the direction of displacement of the first duct portion.

6. The air outlet device according to claim 1, wherein the first duct portion has at least one intermediate wall which divides the first duct portion into at least two air passages.

7. The air outlet device according to claim 3, wherein the first duct portion has at least one intermediate wall which divides the first duct portion into at least two air passages.

8. The air outlet device according to claim 1, wherein the second duct portion has at least one intermediate wall which divides the second duct portion into at least two air passages.

9. The air outlet device according to claim 2, wherein the second duct portion has at least one intermediate wall which divides the second duct portion into at least two air passages.

10. The air outlet device according to claim 4, wherein the second duct portion has at least one intermediate wall which divides the second duct portion into at least two air passages.

11. The air outlet device according to claim 8, wherein the intermediate wall of the second duct portion is pivotable in accordance with a displacement of the first duct element.

12. The air outlet device according to claim 10, wherein the intermediate wall of the second duct portion is pivotable in accordance with a displacement of the first duct element.

13. The air outlet device according to claim 8, wherein the intermediate wall of the second duct portion is designed as a manual actuating element for controlling the displacement of the first duct element.

14. The air outlet device according to claim 12, wherein the intermediate wall of the second duct portion is designed as a manual actuating element for controlling the displacement of the first duct element.

15. The air outlet device according to claim 11, wherein the intermediate wall of the second duct portion is designed as a manual actuating element for controlling the displacement of the first duct element.

16. The air outlet device according to claim 1, wherein the first duct portion, the second duct portion and/or the air outlet opening have a rectangular flow cross section.

17. The air outlet device according to claim 14, wherein the first duct portion, the second duct portion and/or the air outlet opening have a-rectangular flow cross section.

18. The air outlet device according to claim 1, wherein the at least one fin-shaped, movable air conducting element is supported on the first duct portion.

19. An air outlet device for feeding air to a vehicle interior in a controlled manner, the air outlet device comprising:
an air flow duct;
an air outlet opening element which has an air outlet opening, wherein
the air flow duct is connected to the air outlet opening element and is adapted to conduct air from an interior ventilation device via the air outlet opening into the vehicle interior,
the air outlet opening element is formed in a positionally fixed manner, and the air flow duct has a first duct portion and a second duct portion, the second duct portion being arranged between the first duct portion and the air outlet opening element,
the first duct portion is designed so as to be displaceable in a direction transversely with respect to its longitudinal axis, and
at least one fin-shaped, movable air conducting element is arranged in the first duct portion, said air conducting element being displaceable together with the first duct portion and being adapted to control a direction of the air flowing in the first duct portion and therefore a direction of the air flowing out of the air outlet opening in accordance with a position of the air conducting element, wherein
the second duct portion has at least one intermediate wall which divides the second duct portion into at least two air passages, and
the intermediate wall of the second duct portion is designed as a manual actuating element for controlling the displacement of the first duct element.

* * * * *